United States Patent
Kerns et al.

[11] Patent Number: 6,138,655
[45] Date of Patent: *Oct. 31, 2000

[54] AIR/FUEL CONTROL SYSTEM AND METHOD

[75] Inventors: James Michael Kerns, Trenton; William Edward Ortell, Saline; Xiao Wu, Canton, all of Mich.

[73] Assignee: Ford Global Technologies, Inc., Dearborn, Mich.

[ * ] Notice: This patent is subject to a terminal disclaimer.

[21] Appl. No.: 09/437,775

[22] Filed: Nov. 10, 1999

Related U.S. Application Data

[63] Continuation of application No. 09/055,500, Apr. 6, 1998.
[51] Int. Cl.$^7$ .................................................. F02D 41/14
[52] U.S. Cl. ........................ 123/674; 123/681; 123/687; 73/117.3
[58] Field of Search ..................... 123/674, 675, 123/681, 682, 687, 698; 701/109, 114; 73/117.3, 119 A

[56] References Cited

U.S. PATENT DOCUMENTS

| | | | |
|---|---|---|---|
| 5,048,493 | 9/1991 | Orzel et al | 123/698 |
| 5,423,307 | 6/1995 | Okawa et al | 123/698 |

*Primary Examiner*—Andrew M. Dolinar
*Attorney, Agent, or Firm*—John D. Russell

[57] ABSTRACT

An air/ratio control system and method for an internal combustion engine coupled to a fuel vapor recovery system simultaneously maps a difference between a desired air/fuel ratio and a measured air/fuel ratio to fueling errors and a purge vapor flow. This system and method maximizes the ability to purge the vapor recovery system while maintaining the ability to diagnose fuel errors.

13 Claims, 3 Drawing Sheets

AIR/FUEL CONTROL SYSTEM AND METHOD

This is a Continuation of U.S. Ser. No. 09/055,500, filed Apr. 6, 1998.

FIELD OF THE INVENTION

The field of the invention relates to air/fuel control for engines having a fuel vapor recovery system coupled between the fuel supply and the engine's air/fuel intake.

BACKGROUND OF THE INVENTION

Engine air/fuel control systems are known in which fuel delivered to the engine is adjusted in response to the output of an exhaust gas oxygen sensor to maintain average air/fuel ratios at a stoichiometric value. Such systems may also include a fuel vapor recovery system wherein fuel vapors are purged from the fuel system into the engine's air/fuel intake. An example of such a system is disclosed in U.S. Pat. No. 5,048,493. When such systems are employed with conventional electronic engine controls systems that adaptively learn and diagnose fuel and air system errors, a conflict occurs. In particular, error learning and diagnosis must be disabled during purging of the fuel vapor recovery system. Similarly, purging of the fuel vapor recovery system must be disabled during learning and diagnosis of fuel and air system errors.

The inventors herein have discovered numerous disadvantages when disabling purging during fuel error learning and when disabling fuel error learning during purging. Specifically, the maximum amount of purging that can be accomplished is substantially limited, requiring larger and more expensive purge systems. Also, sudden fuel error that occur during purging may not be diagnosed.

SUMMARY OF THE INVENTION

The disadvantages of prior approaches are overcome by a gas flow estimation method for an engine having an exhaust gas sensor and a flow of gasses into an intake manifold of the engine. The method comprises modulating said gas flow entering the engine with a predetermined modulation scheme, calculating an error in response to a desired air/fuel ratio and an indication of exhaust air/fuel ratio, and attributing a portion of said error to said gas flow based on said modulation and engine operating conditions when said engine operating conditions are changing, wherein said engine operating conditions include at least one of an engine speed and an engine airflow.

By using the information in the engine operating conditions changes and, it is possible to use a measurement of error and assign portions of the error to different sources when said engine operating conditions are changing.

An advantage of the present invention is the ability to allow purging of the fuel vapor recovery system continuously.

Another advantage of the present invention is the improved emission control.

Yet another advantage of the present invention is the ability to diagnose fuel errors more accurately.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

BRIEF DESCRIPTION OF THE PREFERRED EMBODIMENT

Figure 1:
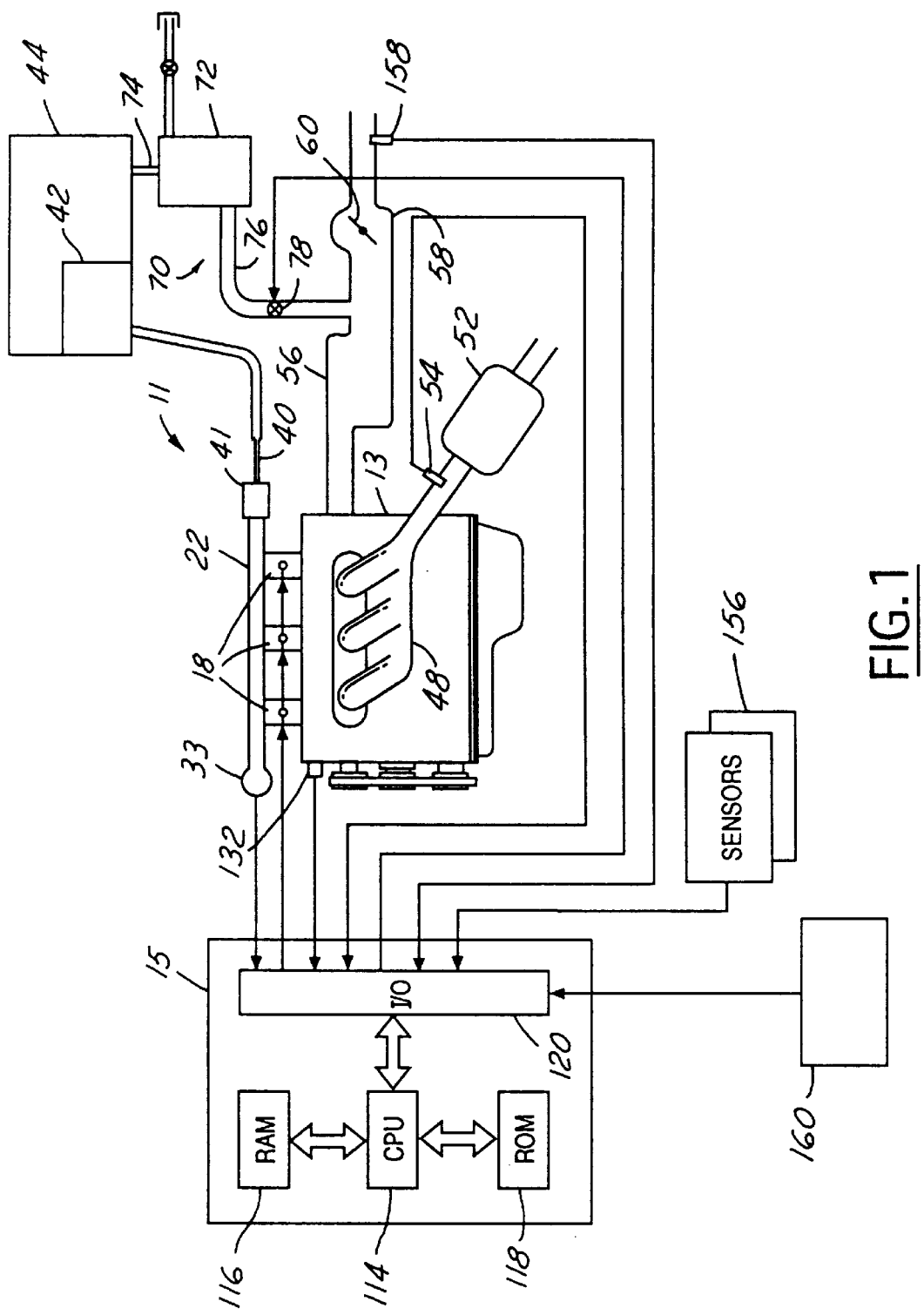
FIG. 1 is a block diagram of an engine incorporating air assist injectors according to the present invention.

Fuel delivery system 11, shown in FIG. 1, of an automotive internal combustion engine 13 is controlled by controller 15, such as an EEC or PCM. Engine 13 comprises fuel injectors 18, which are in fluid communication with fuel rail 22 to inject fuel into the cylinders (not shown) of engine 13, and temperature sensor 32 for sensing temperature of engine 13. Fuel delivery system 11 has fuel rail 22, fuel rail pressure sensor 33 connected to fuel rail 22, fuel line 40 coupled to fuel rail 22 via coupling 41, fuel delivery means 42, which is housed within fuel tank 44, to selectively deliver fuel to fuel rail 22 via fuel line 40.

Engine 13 also comprises exhaust manifold 48 coupled to exhaust ports of the engine (not shown). Catalytic converter 52 is coupled to exhaust manifold 48. A conventional universal exhaust gas oxygen sensor 54 is positioned upstream of catalytic converter 52 in exhaust manifold 48. Engine 13 further comprises intake manifold 56 coupled to intake ports of the engine (not shown). Intake manifold 56 is also coupled to throttle body 58 having throttle plate 60 therein. Intake manifold is also coupled to vapor recovery system 70.

Vapor recovery system 70 comprises charcoal canister 72 coupled to fuel tank 44 via fuel tank connection line 74. Vapor recovery system 70 also comprises vapor control valve 78 positioned in intake vapor line 76 between intake manifold 56 and charcoal canister 72.

Controller 15 has CPU 114, random access memory 116 (RAM), computer storage medium (ROM), 118 having a computer readable code encoded therein, which is an electronically programmable chip in this example, and input/output (I/O) bus 120. Controller 15 controls engine 13 by receiving various inputs through I/O bus 120 such as fuel pressure in fuel deliver system 11, as sensed by pressure sensor 33; relative exhaust air/fuel ratio as sensed by universal exhaust gas oxygen sensor 54, temperature of engine 13 as sensed by temperature sensor 132, measurement of inducted mass airflow (MAF) from mass airflow sensor 158, speed of engine (RPM) from engine speed sensor 160, and various other sensors 156. Controller 15 also creates various outputs through I/O bus 120 to actuate the various components of the engine control system. Such components include fuel injectors 18, fuel delivery means 42, and vapor control valve 78. It should be noted that the fuel may be liquid fuel, in which case fuel delivery means 42 is an electronic fuel pump.

Fuel delivery control means 42, upon demand from engine 13 and under control of controller 15, pumps fuel from fuel tank 44 through fuel line 40, and into pressure fuel rail 22 for distribution to the fuel injectors during conventional operation. Controller 15 controls fuel injectors 18 to maintain a desired air/fuel ratio in response to universal exhaust gas oxygen sensor 54. Controller 15 measures exhaust air/fuel ratio from the output of universal exhaust gas oxygen sensor 54, which is has a substantially linear relation to the actual exhaust air/fuel ratio.

Figure 2:
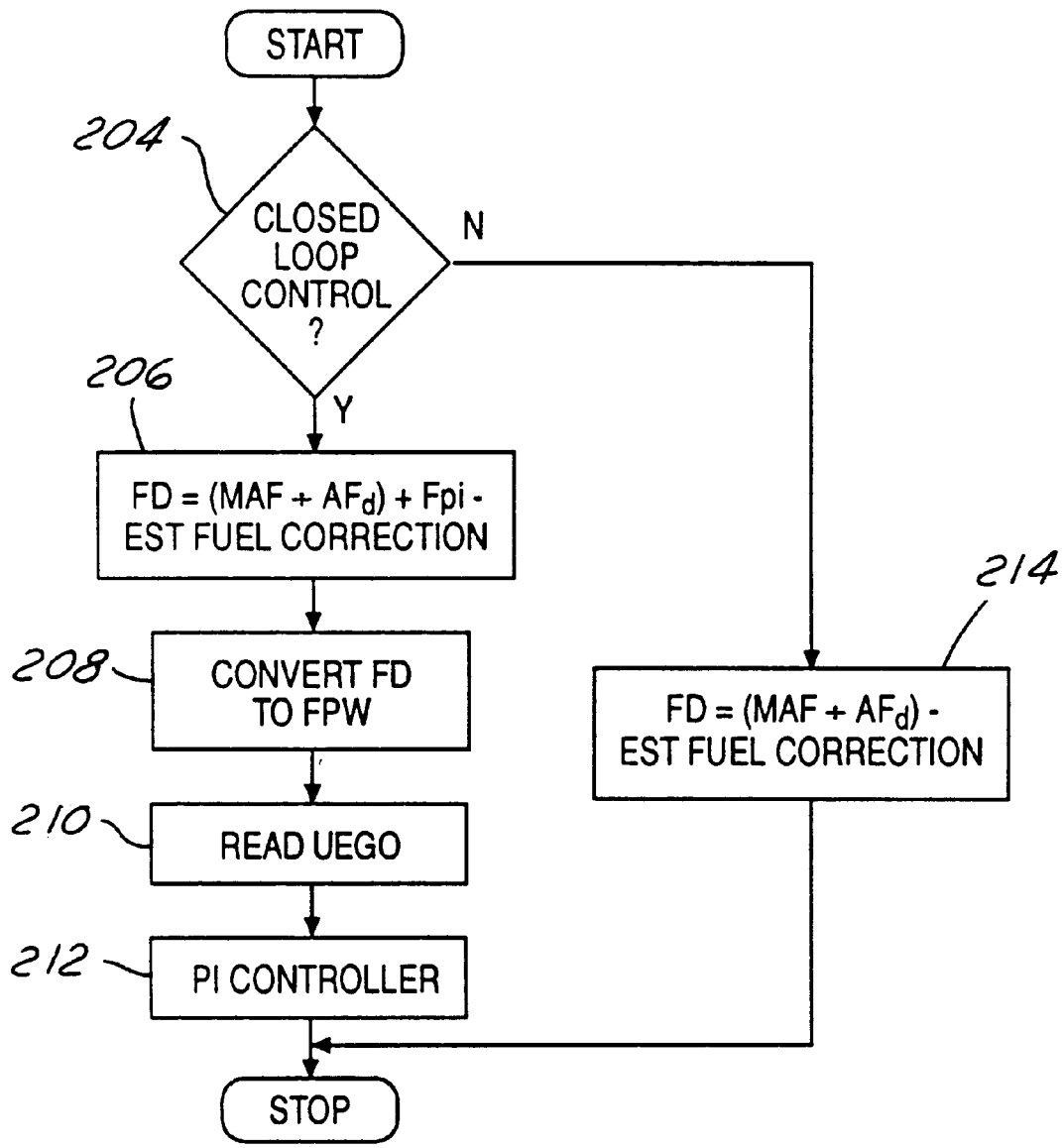
FIGS. 2–3 are flow charts of various operations performed by a portion of the embodiment shown in FIG. 1.

Referring now to FIG. 2, according to the present invention, a flowchart of a routine performed by controller 15 to fuel pulse width signal (FPW) is now described. Fuel pulse width signal (FPW) is the signal sent by controller 15 to fuel injectors 18 to deliver the desired quantity of fuel to engine 13. A determination is first made whether closed-loop air/fuel control is to be commenced (step 204) by monitoring engine operation conditions such as temperature. When closed-loop control commences, the signal FD is calculated by dividing MAF by the desired air/fuel ratio term AFd and adding feedback correction term Fpi and subtracting learned fuel error term EstFuelCorrection as shown in step 206. In step 208, the signal FD is converted to fuel pulse width signal FPW representing a time to actuate fuel injectors 18. In step 210, signal UEGO is read from sensor 54 and subsequently processed in a proportional plus integral controller as described below.

Referring to step 212, signal UEGO is subtracted from signal AFd and then multiplied by gain constant GI and the resulting product added to products previously accumulated ($GI*(AFd_{i-1}-UEGO_{i-1})$). Stated another way, the difference between signal UEGO and AFd is integrated each sample period (i) in steps determined by gain constant GI. Next, the difference signal ($Afd_i-UEGO_i$) for the current step is multiplied by proportional gain GP. Finally, the integral value is added to the proportional value to generate fuel trim signal Fpi. When open-loop control is used, the signal FD is calculated by dividing MAF by the desired air/fuel ratio term AFd and subtracting learned fuel error term EstFuelCorrection as shown in step 214.

Figure 3:
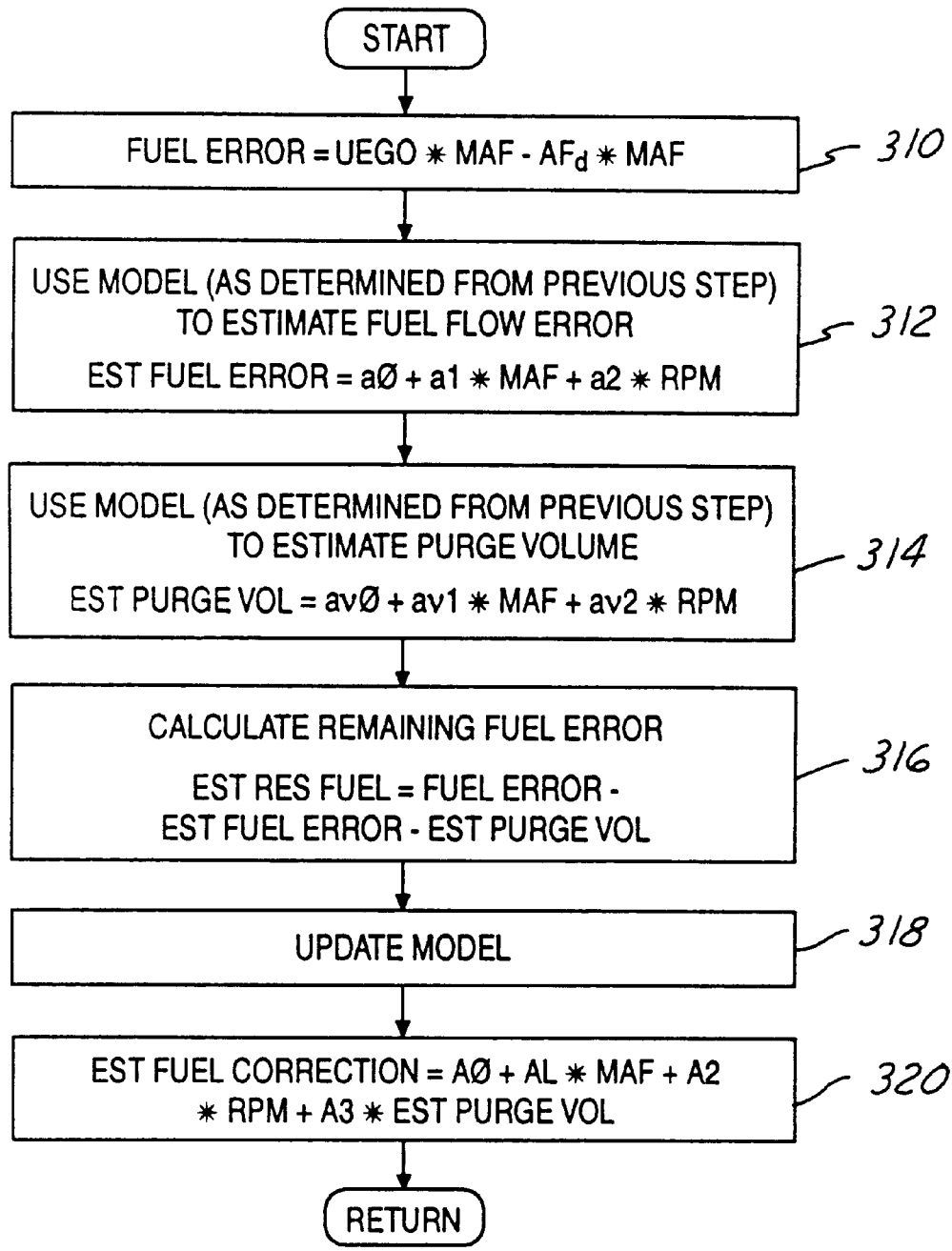

Referring now to FIG. 3, a flowchart of a routine performed by controller 15 to generate the learned fuel error term EstFuelCorrection is now described. This routine is only performed when there is sufficient variation in engine operating conditions, such as for example RPM and MAF. Also, the purge flow, must be modulated during execution of this portion of the routine. The modulation chosen varies the purge flow from zero to the maximum possible flow. In step 310, the fuel error term FuelError is calculated from the difference between the actual air/fuel ratio measured by the UEGO sensor and the desired air/fuel ratio AFd, where the difference is multiplied by the signal MAF. Next, in step 312, a fuel error model is used to estimate the fuel flow error. The model is based on parameters estimated during the previous iteration of the routine. In other words, the model is updated every iteration of the routine and during each iteration, the model is used to predict a fuel error. The estimated fuel error is calculated as the sum of model parameter a0, model parameter a1 multiplied by the signal MAF, and model parameter a2 multiplied by the signal RPM. The model parameters a0 through a2 are the model parameters that were updated during the previous iteration. As described later herein with particular reference to step 318, these parameters will again be updated.

Next, during step 314, a purge model is used to estimate the purge flow entering engine 13. This model is used in a similar way as the fuel error model in that the model is updated during each iteration of the routine as will be described later herein with particular reference to step 318. The estimated purge flow EstPurgeVol is calculated as the sum of model parameter av0, model parameter av1 multiplied by the signal MAF, and model parameter av2 multiplied by the signal RPM. Again, the model parameters av0 through av2 are the model parameters that were updated during the previous iteration. As described later herein with particular reference to step 318, these parameters will again be updated.

The routine then executes step 316, which calculates the remaining error that was not explained by the projected fuel error in step 312 and the projected purge flow in step 314. The remaining error EstResFuel is calculated as the FuelError minus the EstFuelError minus the EstPurgeVol. This error will be used as described later herein with particular reference to step 318 to update the fuel error model and the purge model simultaneously.

In step 318, the remaining error is used to update the models. This is done using two techniques known to those skilled in the art as the Recursive Least Squares Method and Multiple Linear Regression. These methods are described in detail in the book titled, "Multiple Linear Regression" by Draper and Smith and the book titled, "Digital Control of Dynamic Systems", by Franklin and Power. Thus, the parameters a0, a1, and a2 represented by the matrix AA and the parameters av0, av1, and av2, represented by the matrix AV are recalculated according to the following equations:

$A=A_{i-1}+(L*Y)-(X*A)$ where: X a matrix containing the estimated system parameters, Y is a matrix containing measured system parameters, Y=AX, and L is a gain matrix which is calculated from the equation:

$$L = \frac{(P/\gamma)*X}{(1/\alpha)+(X'*(P/\gamma)*X)}$$

where P is the weighted inverse sum of squares of all previous observed system states, $\gamma,\alpha$ are exponential weighting terms related by $\alpha=1-\gamma$, and X' represents the transpose of the matrix X.

$A=AA-AV*af$ where af is defined by EstResFuel=af*EstPurgeVol.

Next, the updated parameters are used to predict the correction term EstFuelCorrection used by the routine shown in FIG. 2. The updated EstFuelCorrection term is calculated as shown in step 320 as the sum of model parameter A0, model parameter A1 multiplied by the signal MAF, model parameter A2 multiplied by the signal RPM, and af.

Thus, the fuel error and the purge flow can be estimated and updated simultaneously and continuously throughout the operation of the engine as long as there is sufficient modulation of all the operation conditions and the purge flow.

While the best mode for carrying out the invention has been described in detail, those skilled in the art in which this invention relates will recognize various alternative designs and embodiments, including those mentioned above, in practicing the invention that has been defined by the following claims.

What is claimed is:

1. A gas flow estimation method for an engine having an exhaust gas sensor and a flow of gasses into an intake manifold of the engine, said method comprising:

modulating said gas flow entering the engine with a predetermined modulation scheme;

calculating an error value in response to a desired air/fuel ratio and an indication of exhaust air/fuel ratio; and attributing a specified portion of said error value to said gas flow based on said modulation and engine operating conditions when said engine operating conditions are changing, wherein said engine operating conditions include at least one of an engine speed and an engine airflow.

2. The method recited in claim 1 wherein said attributing further comprises attributing said specified portion of said error value to an estimated gas flow based on said modulation scheme.

3. The method recited in claim 1 wherein said gas flow comprises a flow of purged fuel vapors.

4. The method recited in claim 1 further comprising attributing a difference between said error value and said specified portion to a fueling error.

5. The method recited in claim 1 further comprising suspending said attributing in response to a lack of said chance in said conditions.

6. The method recited in claim 1 further comprising adjusting a fuel injection amount based on said estimated gas flow.

7. A flow estimation method for an engine having an exhaust gas sensor, said method comprising:

modulating a flow entering the engine with a predetermined modulation scheme;

calculating a fueling difference in response to a difference between a desired air/fuel ratio and a measured exhaust air/fuel ratio; and simultaneously mapping said fueling difference to a fueling error and to an estimated flow based on said modulation scheme and a change in engine operating conditions to appropriately assign said fueling difference to said fueling error and said estimated flow.

8. The method recited in claim 7 further comprising suspending said mapping step in response to a lack of said change in said engine operating conditions.

9. The method recited in claim 7 wherein said predetermined modulation scheme comprises modulating said purge flow between a predetermined minimum value and a predetermined maximum value.

10. The method recited in claim 7 wherein said fueling error is a first function of a first set of engine operating conditions and said flow is a second function of a second set of engine operating conditions.

11. The method recited in claim 10 wherein said first set of engine operating conditions includes engine airflow, engine speed, and purge vapor flow.

12. The method recited in claim 10 wherein said second set of engine operating conditions includes engine airflow and engine speed.

13. The method recited in claim 7 wherein said flow is a fuel vapor surge flow.

* * * * *